R. J. C. TAMPIER.
CONTROL HAND LEVER WITH BRAKED MOTION.
APPLICATION FILED MAR. 30, 1921.

1,406,103. Patented Feb. 7, 1922.

INVENTOR.
René Jean Camille Tampier
BY
ATTORNEY

UNITED STATES PATENT OFFICE.

RENÉ JEAN CAMILLE TAMPIER, OF BOULOGNE-SUR-SEINE, FRANCE.

CONTROL HAND LEVER WITH BRAKED MOTION.

1,406,103. Specification of Letters Patent. Patented Feb. 7, 1922.

Application filed March 30, 1921. Serial No. 456,960.

(GRANTED UNDER THE PROVISIONS OF THE ACT OF MARCH 3, 1921, 41 STAT. L., 1313.)

*To all whom it may concern:*

Be it known that I, RENÉ JEAN CAMILLE TAMPIER, citizen of the Republic of France, and resident of Boulogne-sur-Seine, France, post-office address 1 Rue de Bellevue, have invented a new and useful Control Hand Lever with Braked Motion, (for which I have filed an application in France, August 28, 1918, Patent No. 498,300,) which improvements are fully set forth in the following specification.

The present invention relates to braking attachments for hand levers; and it resides in the provision of certain improved devices which are applicable to controlling levers of the hand-operated type and which are of such a character as to prevent the lever from becoming displaced accidentally when subjected to vibrations of any character, the braking action being obtained by the movement of a part or member which requires only a slight effort to effect its actuation.

Figures 1, 2, 3:
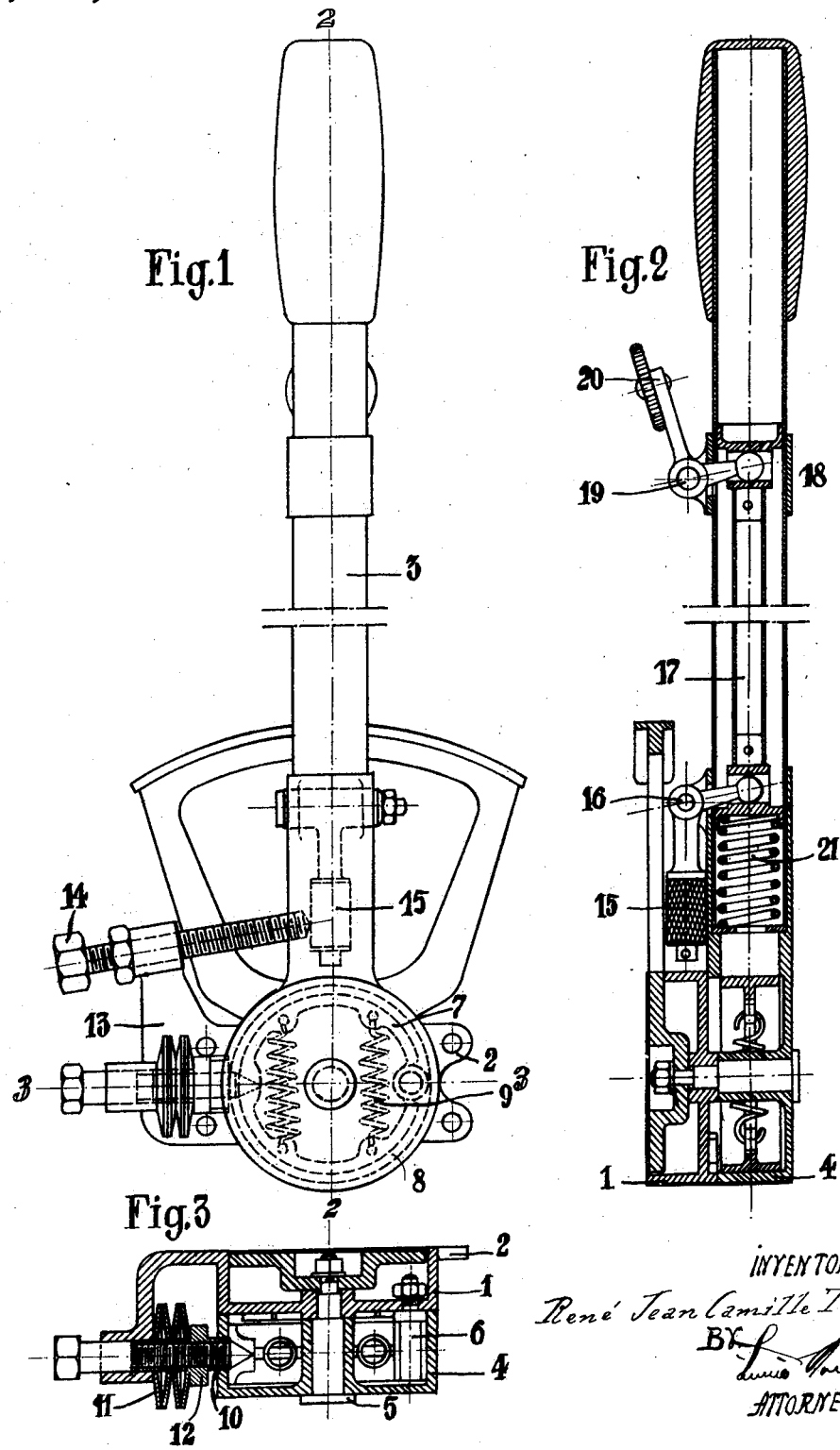
Figure 1 is a front elevation of one embodiment of the invention.
Fig. 2 is a longitudinal section on line 2—2, Fig. 1.
Fig. 3 is a transverse section on line 3—3, Fig. 1.

Referring more particularly to the drawing, 1 designates a support or base which is attached by means of ears 2 to the stationary body relatively to which the lever is to be moved. The latter comprises an arm 3 which is rigidly connected with a hollow cylindrical hub 4, so that the two parts 3 and 4 will turn as a unit about the stud or pin 5 whereon the hub is axially mounted; the stud serving to hold said hub against the base, as will be understood from Figs. 2 and 3.

The base 1 carries a pin 6 (Fig. 3) which projects into the interior of the cylindrical hub 4 and has pivoted upon it the ends of two oppositely-curved brake-shoes 7 and 8, connected together by a pair of cross-springs 9 which tend to normally pull them toward each other and, consequently, away from the walls of the hub. The free ends of the brake-shoes are inclined or beveled, so that when a pointed or wedge-shaped element is inserted between the latter ends, the shoes will be spread apart so as to engage the inner faces of the hub walls and thus produce the desired braking action.

This wedging operation is effected by means of a threaded bolt or screw 10 which is supported on base 1 through the intermediary of two Belleville washers 11 mounted on a sleeve-like part 12 in which screw 10 is designed to turn; said sleeve comprising two plates or members which hold it in place in hub 4 and prevent it from turning. The washers 11 are employed to damp the force of the clamping action and to obtain a yielding pressure of the screw end between the shoes 7 and 8; and when said screw is tightened, the washers are compressed and the shoes are forced apart. Rotation of the screw in the opposite direction will, of course, permit the automatic expansion of the washers, and the inward movement of the shoes under the influence of the springs 9, thus disrupting the braking action.

In addition to the parts above described, there is provided an auxiliary support 13 which is integral with the base 1 and comprises a sleeve bearing through which is threaded a stop screw or bolt 14. The inner end of this stop bolt is adapted to engage the lower arm of a bell-crank lever 15 which is fulcrumed on a pivot pin 16 carried by the lever 3, the other arm of the bell-crank lever projecting through an opening into the interior of the lever 3 where it is subjected to the action of a spring 21 which tends to swing it in an upward direction, thus maintaining the first-named arm in engagement with the end of bolt 14. As shown in Fig. 2 the spring 21 bears immediately against a follower provided on the lower end of a rod 17 and having a socket wherein the second-named arm of the bell-crank lever 15 is engaged; said rod 17 being slidably arranged within the main lever 3 and carrying at its upper end a second socketed member in which one arm of a bell-crank lever 18 is engaged. This lever 18 is likewise fulcrumed on a pin carried by lever 3 and indicated at 19, and its other arm extends in an upward direction and is provided with a thumb-piece or button 20 which is normally forced away from lever 3 by the action of spring 21. Application of pressure inwardly against button 20 causes the bell-crank 18 to rock in a clockwise direction, thereby pushing rod 17 downward and, in consequence, rocking the lower bell-crank 15 clockwise. The actuation of the latter bell-crank removes its stop arm from the path of bolt 14, and the main lever 3 may then be operated as desired.

I claim as my invention:—

1. The combination of a hand lever having a hollow, cylindrical hub; a pair of brake-shoes disposed within said hub and movable into and out of braking engagement with the inner faces of the walls thereof; and means for controlling the operation of said shoes.

2. The combination of a hand lever having a hollow, cylindrical hub; a pair of brake-shoes disposed within said hub and movable into and out of braking engagement with the inner faces of the walls thereof, said shoes being pivotally mounted at one end and beveled or inclined at the other end; springs connecting the shoes to normally pull them away from the hub walls; and a movable element having a pointed end cooperative with the beveled ends of the shoes to force the latter against said walls.

3. The combination of a hand lever having a hollow, cylindrical hub; a pair of brake-shoes disposed within said hub and movable into and out of braking engagement with the inner faces of the walls thereof; an operating member for the shoes; a common support whereon said hub and said operating member are fulcrumed; and spring means interposed between said member and its fulcrum to obtain a yielding pressure of the former on the shoes.

4. The combination of a hand lever having a hollow, cylindrical hub; a pair of brake-shoes disposed within said hub and movable into and out of braking engagement with the inner faces of the walls thereof, said shoes being pivotally mounted at one end and beveled or inclined at the other end; springs connecting the shoes to normally pull them away from the hub walls; a movable element having a pointed end cooperative with the beveled ends of the shoes to force the latter against said walls; a common support whereon said hub and said movable element are fulcrumed; and spring means interposed between the movable element and its fulcrum to obtain a yielding pressure of the pointed end of the former between the beveled shoe ends.

5. The combination of a hand lever having a hollow, cylindrical hub; a pair of brake-shoes disposed within said hub and movable into and out of braking engagement with the inner faces of the walls thereof; means for controlling the operation of said shoes; a base whereon said lever is fulcrumed; a stop carried by said base; and a companion stop carried by the lever and movable relatively to the same into and out of position to engage the first-named stop.

6. The combination of a hand lever having a hollow, cylindrical hub; a pair of brake shoes disposed within said hub and movable into and out of braking engagement with the inner faces of the walls thereof; means for controlling the operation of said shoes; a base whereon said lever is fulcrumed; a stop carried by said base; and a bell-crank pivoted to said lever and having one arm movable into and out of position to engage said stop.

In testimony whereof I have signed this specification in the presence of two subscribing witnesses.

RENÉ JEAN CAMILLE TAMPIER.

Witnesses:
FERNAND DUFOUR,
CHARLES LEON LOISEL.